(12) United States Patent
Tung et al.

(10) Patent No.: US 9,921,674 B2
(45) Date of Patent: Mar. 20, 2018

(54) TOUCH-SENSING LIQUID CRYSTAL DISPLAY PANEL

(71) Applicant: HannsTouch Solution Incorporated, Taipei (TW)

(72) Inventors: Kuo-Hsiung Tung, Taoyuan (TW); Pin-Yu Hsu, Tainan (TW); Chuan-Hui Su, Kaohsiung (TW)

(73) Assignee: HannsTouch Solution Incorporated, Tainan (TW)

( * ) Notice: Subject to any disclaimer, the term of this patent is extended or adjusted under 35 U.S.C. 154(b) by 98 days.

(21) Appl. No.: 14/961,896

(22) Filed: Dec. 8, 2015

(65) Prior Publication Data

US 2016/0092013 A1   Mar. 31, 2016

Related U.S. Application Data

(62) Division of application No. 13/727,573, filed on Dec. 26, 2012, now abandoned.

(30) Foreign Application Priority Data

Jul. 12, 2012 (TW) .............................. 101125143 A

(51) Int. Cl.
| | | |
|---|---|---|
| G06F 3/041 | (2006.01) | |
| G02F 1/1333 | (2006.01) | |
| G06F 3/044 | (2006.01) | |
| G02F 1/1335 | (2006.01) | |
| G02F 1/1343 | (2006.01) | |
| G06F 3/047 | (2006.01) | |

(52) U.S. Cl.
CPC ........ *G06F 3/0412* (2013.01); *G02F 1/13338* (2013.01); *G02F 1/13439* (2013.01); *G02F 1/133528* (2013.01); *G06F 3/044* (2013.01); *B32B 2457/208* (2013.01); *G06F 3/047* (2013.01); *G06F 2203/04103* (2013.01)

(58) Field of Classification Search
CPC ........ G06F 3/0412; G06F 3/044; G06F 3/047; G06F 2203/04103
USPC .......................................... 349/12
See application file for complete search history.

(56) References Cited

U.S. PATENT DOCUMENTS

| | | | | |
|---|---|---|---|---|
| 2011/0050612 | A1* | 3/2011 | Matsumoto | G06F 3/0412 345/173 |
| 2011/0187672 | A1* | 8/2011 | Hung | G06F 3/044 345/174 |
| 2011/0304571 | A1* | 12/2011 | Kim | G02F 1/13338 345/173 |
| 2012/0154334 | A1* | 6/2012 | Furuhashi | G06F 3/0412 345/174 |

\* cited by examiner

*Primary Examiner* — Angela Davison
(74) *Attorney, Agent, or Firm* — Winston Hsu

(57) ABSTRACT

The present invention provides a touch-sensing panel including a polarization plate and a patterned sensing electrode layer. The polarization plate has a first surface and a second surface, and the first surface and the second surface are disposed opposite to each other. The first patterned sensing electrode layer is disposed on the first surface, and the first patterned sensing electrode layer is directly attached on the first surface of the polarization plate.

5 Claims, 10 Drawing Sheets

TOUCH-SENSING LIQUID CRYSTAL DISPLAY PANEL

CROSS REFERENCE TO RELATED APPLICATIONS

This application is a divisional application of and claims the benefit of U.S. patent application Ser. No. 13/727,573, filed Dec. 26, 2012.

BACKGROUND OF THE INVENTION

1. Field of the Invention

The present invention relates to a touch-sensing panel and a touch-sensing liquid crystal display panel using the same, and more particularly, to a touch-sensing panel having a patterned sensing electrode layer directly formed on a polarization plate and a touch-sensing liquid crystal display panel using the same.

2. Description of the Prior Art

The touch-sensing panel has been widely used in the input interfaces of the instruments for its properties such as the great interaction between machines and humans. In recent years, more consumer electronics, such as mobile phones, GPS navigator systems, tablet computers, personal digital assistances (PDA), and laptop computers are employed with touch display panels. In general, the touch-sensing panel is combined with the liquid crystal display panel to form a touch-sensing liquid crystal display panel. However, the liquid crystal display panel and the touch-sensing panel are finished individually, and then, are stacked sequentially and assembled to become one. Thus, the thickness and the weight of the touch-sensing liquid crystal display panel are limited by the thicknesses and the weights of the liquid crystal display panel and the touch-sensing panel themselves. For this reason, to reduce the thickness and the weight of the touch-sensing liquid crystal display panel to decrease the manufacturing cost of the touch-sensing liquid crystal display panel is an objective in this field.

SUMMARY OF THE INVENTION

It is therefore an objective of the present invention to provide a touch-sensing panel and a touch-sensing liquid crystal display panel using the same to reduce the thickness and the weight of the touch-sensing liquid crystal display panel and decrease the manufacturing cost of the touch-sensing liquid crystal display panel.

According to an embodiment, the present invention provides a touch-sensing panel including a polarization plate and a first patterned sensing electrode layer. The polarization plate has a first surface and a second surface, and the first surface and the second surface are disposed opposite to each other. The first patterned sensing electrode layer is disposed on the first surface of the polarization plate, and the first patterned sensing electrode layer is directly attached on the first surface of the polarization plate.

According to an embodiment, the present invention provides a touch-sensing liquid crystal display panel including a liquid crystal panel, a first polarization plate, and a touch-sensing panel. The liquid crystal panel has a display surface and a back surface, the display surface and the back surface are disposed opposite to each other. The first polarization plate is disposed on the back surface of the liquid crystal panel. The touch-sensing panel is disposed on the display surface of the liquid crystal panel, and the touch-sensing panel includes a second polarization plate and a first patterned sensing electrode layer. The second polarization plate has a first surface and a second surface, and the first surface and the second surface are disposed opposite to each other. The first patterned sensing electrode layer is disposed on the first surface of the second polarization plate, and the first patterned sensing electrode layer is directly attached on the first surface of the second polarization plate.

The present invention directly forms at least one of the patterned sensing electrode layers on a surface of the second polarization plate to directly attach the patterned sensing electrode layer on the surface of the second polarization plate. Thus, the transparent substrate that is used to dispose the patterned sensing electrode layer in the prior art can be eliminated in the touch-sensing liquid crystal display panel of the present invention, and the thickness of the touch-sensing liquid crystal display panel can accordingly be reduced. For this reason, the weight of the touch-sensing liquid crystal display panel can be reduced, and thereby, the manufacturing cost of the touch-sensing liquid crystal display panel can be decreased.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention, exemplary embodiments will be detailed as follows. The exemplary embodiments of the present invention are illustrated in the accompanying drawings with numbered elements to elaborate the contents and effects to be achieved.

Figure 1:
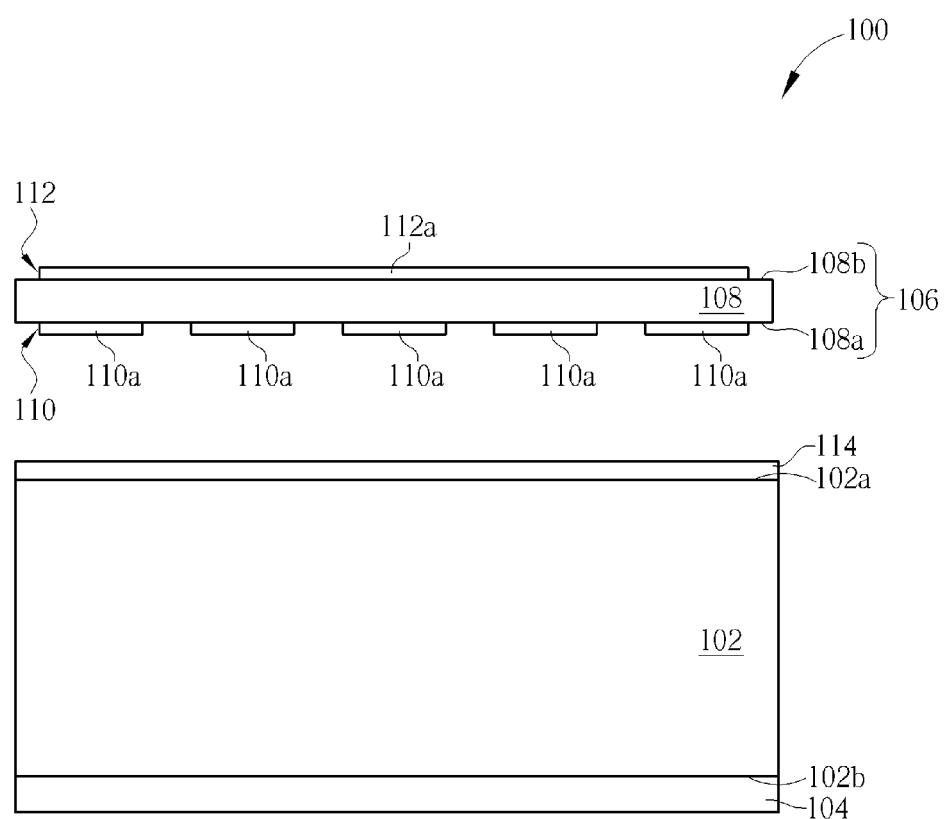
FIG. 1 is a schematic diagram illustrating an exploded cross-sectional view of a touch-sensing liquid crystal display panel according to a first embodiment of the present invention.
Figure 2:
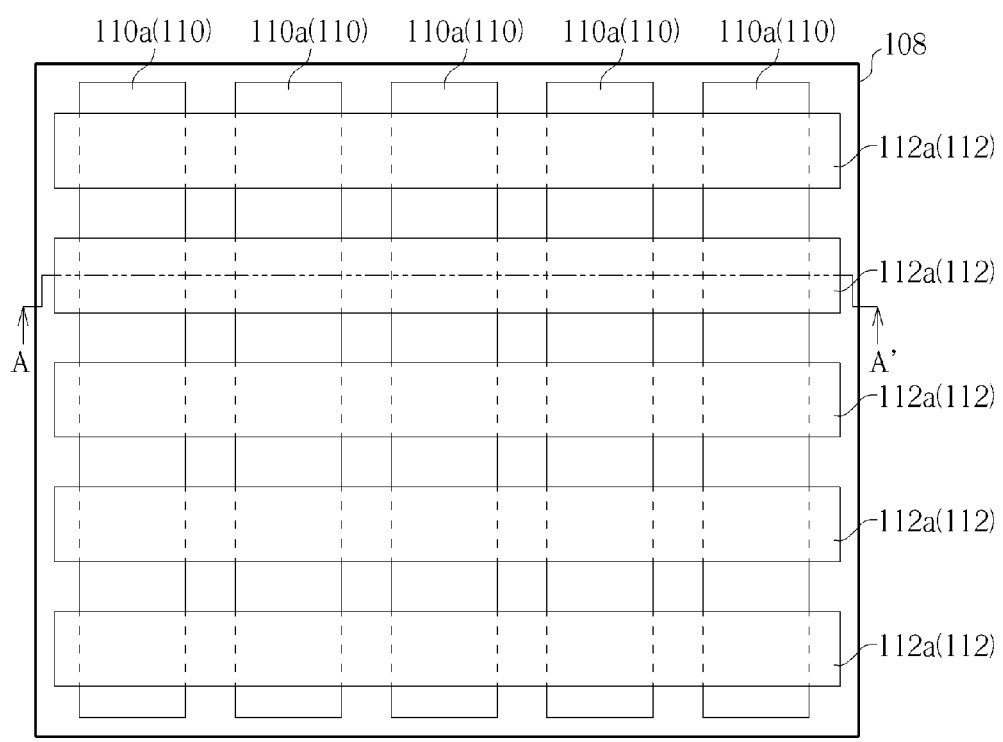
FIG. 2 is a schematic diagram illustrating a top view of a touch-sensing panel according to the first embodiment of the present invention.

Please refer to FIG. 1 and FIG. 2. FIG. 1 is a schematic diagram illustrating an exploded cross-sectional view of a touch-sensing liquid crystal display panel according to a first embodiment of the present invention, and FIG. 2 is a schematic diagram illustrating a top view of a touch-sensing panel according to the first embodiment of the present invention, wherein FIG. 1 is the exploded cross-sectional view of FIG. 2 taken along a cross-sectional line A-A'. As shown in FIG. 1, the touch-sensing liquid crystal display panel 100 includes a liquid crystal panel 102, a first polarization plate 104, and a touch-sensing panel 106. The liquid crystal panel 102 has a display surface 102a and a back surface 102b disposed opposite to each other, and the first polarization plate 104 is disposed and attached on the back surface 102b of the liquid crystal panel 102. A backlight source can be disposed on the back surface 102b of the liquid crystal panel 102, and the light generated from the backlight source can enter the liquid crystal panel 102 from the back surface 102b and thereby display frames from the display surface 102a by controlling the rotated direction of the liquid crystal molecules of the liquid crystal panel 102 to show variance of brightness in each pixel. Furthermore, touch-sensing panel 106 includes a second polarization plate 108, a first patterned sensing electrode layer 110, and a second patterned sensing electrode layer 112. The second polarization plate 108 is disposed on the display surface 102a of the liquid crystal panel 102, and has a first surface 108a and a second surface 108b disposed opposite to each other. The first surface 108a faces the display surface 102a of the liquid crystal panel 102, but the present invention is not limited to this. Furthermore, a polarization direction of the first polarization plate 104 can be perpendicular to or parallel to a polarization direction of the second polarization plate 108, and the polarization direction of the first polarization plate 104 and the polarization direction of the second polarization plate 108 can be determined by the type and the structure of the liquid crystal panel 102, such as alignment directions of an upper alignment film and a lower alignment film of the liquid crystal panel, a type of the liquid crystal molecule or an operating mode of bright state or dark state, but the present invention is not limited herein.

In this embodiment, the first patterned sensing electrode layer 110 and the second patterned sensing electrode layer 112 are respectively disposed on the first surface 108a and the second surface 108b of the second polarization plate 108. Furthermore, the first patterned sensing electrode layer 110 is directly formed on the first surface 108a of the second polarization plate 108, and therefore, can be directly attached on the first surface 108a of the second polarization plate 108. The second patterned sensing electrode layer 112 is directly formed on the second surface 108b of the second polarization plate 108, and therefore, can be directly attached on the second surface 108b of the second polarization plate 108. In other words, the second polarization plate 108 is directly used as a substrate to form the first patterned sensing electrode layer 110 and the second patterned sensing electrode layer 112 in the touch-sensing panel 106. Thus, the second polarization plate 108 can be configured to insulate the first patterned sensing electrode layer 110 from the second patterned sensing electrode layer 112, and the touch sensing error can be accordingly avoided due to the first patterned sensing electrode layer 110 being insulated from the second patterned sensing electrode layer 112. Moreover, a cost of transparent substrates that are used to dispose patterned sensing electrodes in the prior art can be saved in the touch-sensing liquid crystal display panel 100, and a thickness of the touch-sensing liquid crystal display panel 100 can therefore be reduced, thereby decreasing a weight of the touch-sensing liquid crystal display panel 100. Since a thickness and a weight of the polarization plate 108 is less than that of a glass substrate used in the prior art, so that a thickness and a weight of the touch-sensing panel 106 also can be reduced. A method of forming the first patterned sensing electrode layer 110 and a method of forming the second patterned sensing electrode layer 112 can respectively include performing a deposition process, such as an evaporation process or an electroplating process, to deposit transparent conductive materials, such as indium tin oxide (ITO), indium zinc oxide (IZO), antimony tin oxide (ATO) or antimony zinc oxide (AZO), respectively on the first surface 108a and the second surface 108b of the second polarization plate 108, and then, performing a patterning process, such as a photolithographic and etching process, to pattern the transparent conductive materials to form the first patterned sensing electrode layer 110 and the second patterned sensing electrode layer 112.

In addition, the touch-sensing liquid crystal display panel 100 further includes a first adhesive layer 114 disposed between the touch-sensing panel 106 and the liquid crystal panel 102 and covering the whole first patterned sensing electrode layer 110 to attach the second polarization plate 108 of the touch-sensing panel 106 to the display surface 102a of the liquid crystal panel 102. In other embodiment of the present invention, the first adhesive layer also cannot overlap the first patterned sensing electrode layer and the second patterned sensing electrode layer, and the first adhesive layer is disposed at a peripheral region of the touch-sensing panel.

As shown in FIG. 2, the touch-sensing panel 106 includes a capacitive touch-sensing panel, but the present invention is not limited herein. The first patterned sensing electrode layer 110 can includes a plurality of first sensing electrodes 110a arranged in parallel and sequentially along a first direction X. The second patterned sensing electrode layer 112 can includes a plurality of second sensing electrodes 112a arranged in parallel and sequentially along a second direction Y different from the first direction X. The first sensing electrodes 110a cross the second sensing electrode 112a, so that the first sensing electrodes 110a can be configured to sense a position of an object touching the touch-sensing panel 106 in the first direction X, and the second sensing electrodes 112a can be configured to sense a position of the object touching the touch-sensing panel 106 in the second direction Y. In this embodiment, the first direction X and the second direction Y are perpendicular to each other, but the present invention is not limited to this. Furthermore, each first sensing electrode 110a and each second sensing electrode 112a are respectively stripe-shaped, but are not limited herein. In other embodiments of the present invention, each first sensing electrode and each second sensing electrode also can be respectively a series formed by a plurality of square, diamond or hexagonal pads. Also, the arranged direction of the first sensing electrodes and the arranged direction of the second sensing electrodes can be exchanged.

As the above description, the first patterned sensing electrode layer 110 and the second patterned sensing electrode layer 112 of touch-sensing liquid crystal display panel 100 in this embodiment are directly formed on first surface 108a and the second surface 108b of the second polarization plate 108 respectively, so that the cost of two transparent substrates, such as two transparent glass substrates, that are respectively used to dispose the first patterned sensing electrode layer and the second patterned sensing electrode layer in the prior art can be saved in the touch-sensing liquid crystal display panel 100. A thickness and a weight of the touch-sensing liquid crystal display panel 100 can therefore be reduced, and thereby, the cost of the touch-sensing liquid crystal display panel 100 can be decreased.

The touch-sensing liquid crystal display panel of the present invention is not limited to the above-mentioned embodiment. The following description continues to detail the other embodiments or modifications, and in order to simplify and show the difference between the other embodiments or modifications and the above-mentioned embodiment, the same numerals denote the same components in the following description, and the same parts are not detailed redundantly.

Figure 3:
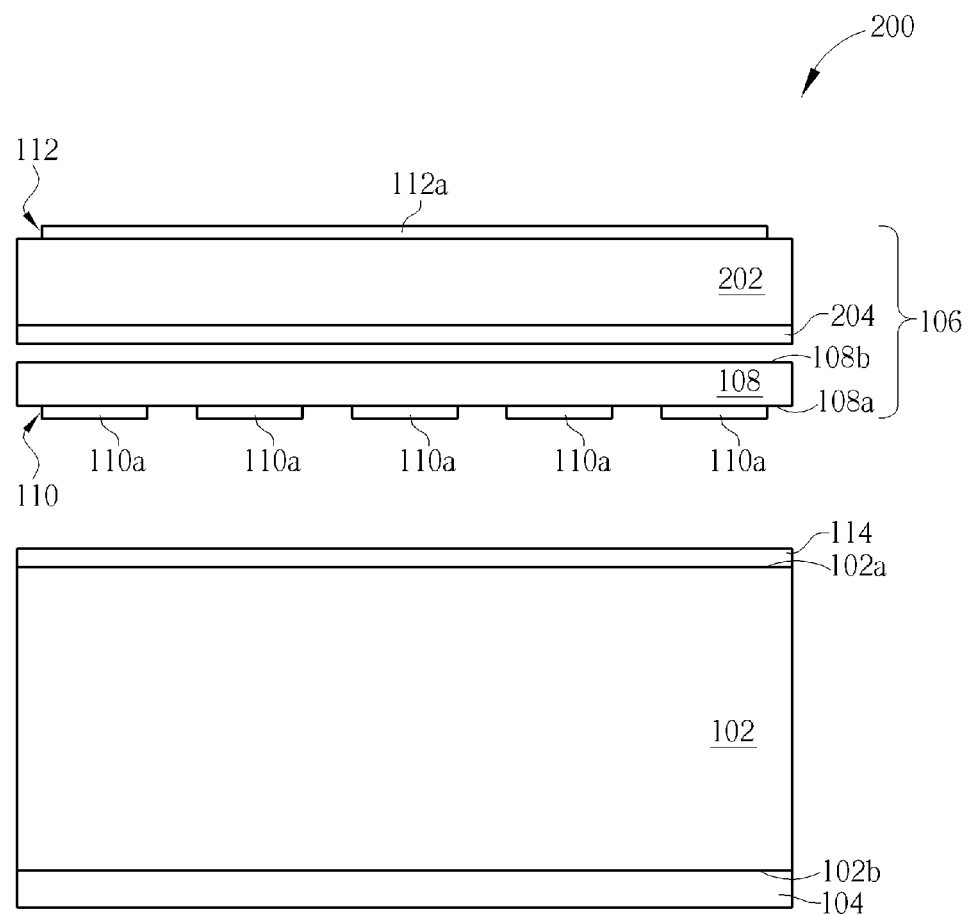
FIG. 3 is a schematic diagram illustrating an exploded cross-sectional view of a touch-sensing liquid crystal display panel according to a second embodiment of the present invention.

Please refer to FIG. 3, which is a schematic diagram illustrating an exploded cross-sectional view of a touch-sensing liquid crystal display panel according to a second embodiment of the present invention. As shown in FIG. 3, as compared with the first embodiment, the touch-sensing panel 106 of the touch-sensing liquid crystal display panel 200 in this embodiment further includes a transparent substrate 202 and a second adhesive layer 204 disposed on the second surface 108b of the second polarization plate 108. Furthermore, the transparent substrate 202 and the second adhesive layer 204 are disposed between the second surface 108b of the second polarization plate 108 and the second patterned sensing electrode layer 112. The second patterned sensing electrode layer 112 is directly formed on a top surface of the transparent substrate 202, and therefore, is directly attached on the transparent substrate 202. The second adhesive layer 204 is disposed between the transparent substrate 202 and the second polarization plate 108, and is configured to attach the second polarization plate 108 to the transparent substrate 202. The arranged directions of the first sensing electrodes 110a and the second sensing electrode 112a of this embodiment are the same as the above embodiment, and will not be mentioned redundantly. In other embodiments of the present invention, each first sensing electrode and each second sensing electrode also can be respectively a series formed by a plurality of square, diamond or hexagonal pads. Also, the arranged direction of the first sensing electrodes and the arranged direction of the second sensing electrodes can be exchanged. It should be noted that the first patterned sensing electrode layer 110 of touch-sensing liquid crystal display panel 200 in this embodiment are directly formed on first surface 108a of the second polarization plate 108 respectively, so that a cost of a transparent substrate, such as a transparent glass substrate, that is used to dispose the first patterned sensing electrode layer in the prior art can be saved in the touch-sensing liquid crystal display panel 200. Accordingly, thicknesses and weights of the touch-sensing panel 106 and the touch-sensing liquid crystal display panel 200 can be reduced, and thereby, the cost of the touch-sensing liquid crystal display panel 200 can be decreased.

Figure 4:
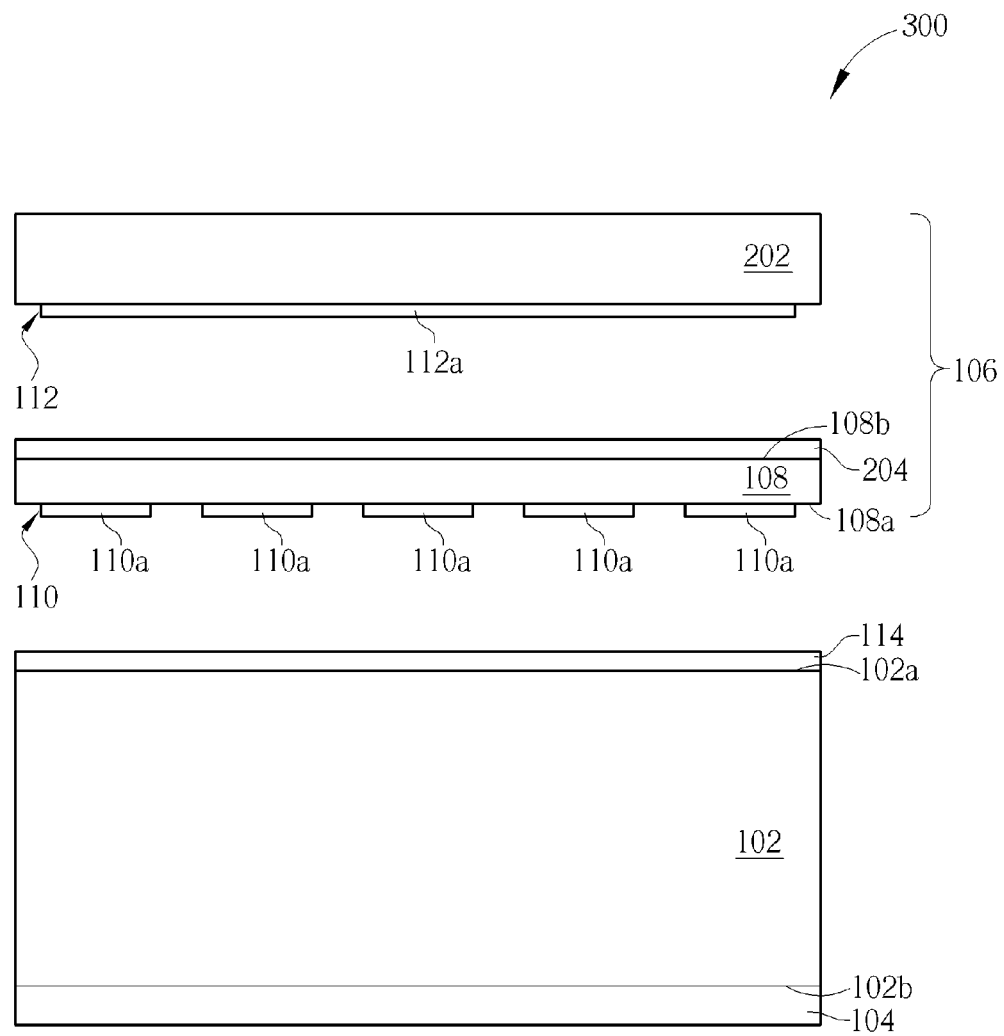
FIG. 4 is a schematic diagram illustrating an exploded cross-sectional view of a touch-sensing liquid crystal display panel according to a third embodiment of the present invention.

Please refer to FIG. 4, which is a schematic diagram illustrating an exploded cross-sectional view of a touch-sensing liquid crystal display panel according to a third embodiment of the present invention. As shown in FIG. 4, as compared with second embodiment, the second patterned sensing electrode layer 112 of the touch-sensing liquid crystal display panel 300 in this embodiment is directly formed on a bottom surface of the transparent substrate 202, and is disposed between the transparent substrate 202 and the second polarization plate 108 accordingly. Furthermore, the second adhesive layer 204 is disposed between the second patterned sensing electrode layer 112 and the second polarization plate 108, and is configured to attach the surface of the transparent substrate 202 having the second patterned sensing electrode layer 112 to the second surface 108b of the second polarization plate 108.

Figure 5:
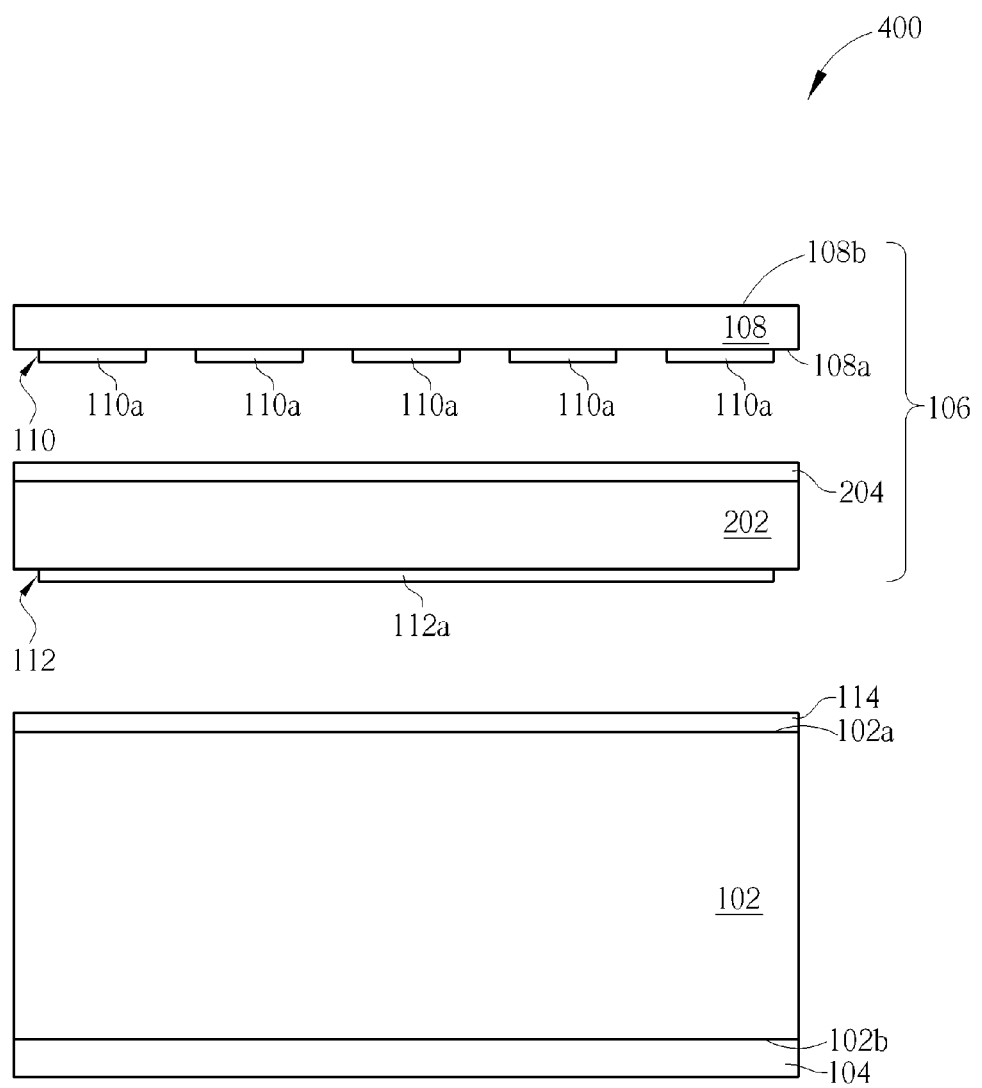
FIG. 5 is a schematic diagram illustrating an exploded cross-sectional view of a touch-sensing liquid crystal display panel according to a fourth embodiment of the present invention.

Please refer to FIG. 5, which is a schematic diagram illustrating an exploded cross-sectional view of a touch-sensing liquid crystal display panel according to a fourth embodiment of the present invention. As shown in FIG. 5, as compared with second embodiment, the second patterned sensing electrode layer 112, the transparent substrate 202 and the second adhesive layer 204 of the touch-sensing liquid crystal display panel 400 in this embodiment are disposed between the first surface 108a of the second polarization plate 108 and the liquid crystal panel 102, and the second patterned sensing electrode layer 112 is directly formed on the bottom surface of the transparent substrate 202. Furthermore, the transparent substrate 202 is disposed between the first patterned sensing electrode layer 110 and the second patterned sensing electrode layer 112, and is configured to insulate the first patterned sensing electrode layer 110 from the second patterned sensing electrode layer 112. The first adhesive layer 114 is disposed between the transparent substrate 202 and the liquid crystal panel 102, and is configured to attach the transparent substrate 202 to the liquid crystal panel 102. The second adhesive layer 204 is disposed between the transparent substrate 202 and the second polarization plate 108, and is configured to attach the transparent substrate 202 to the second polarization plate 108.

Figure 6:
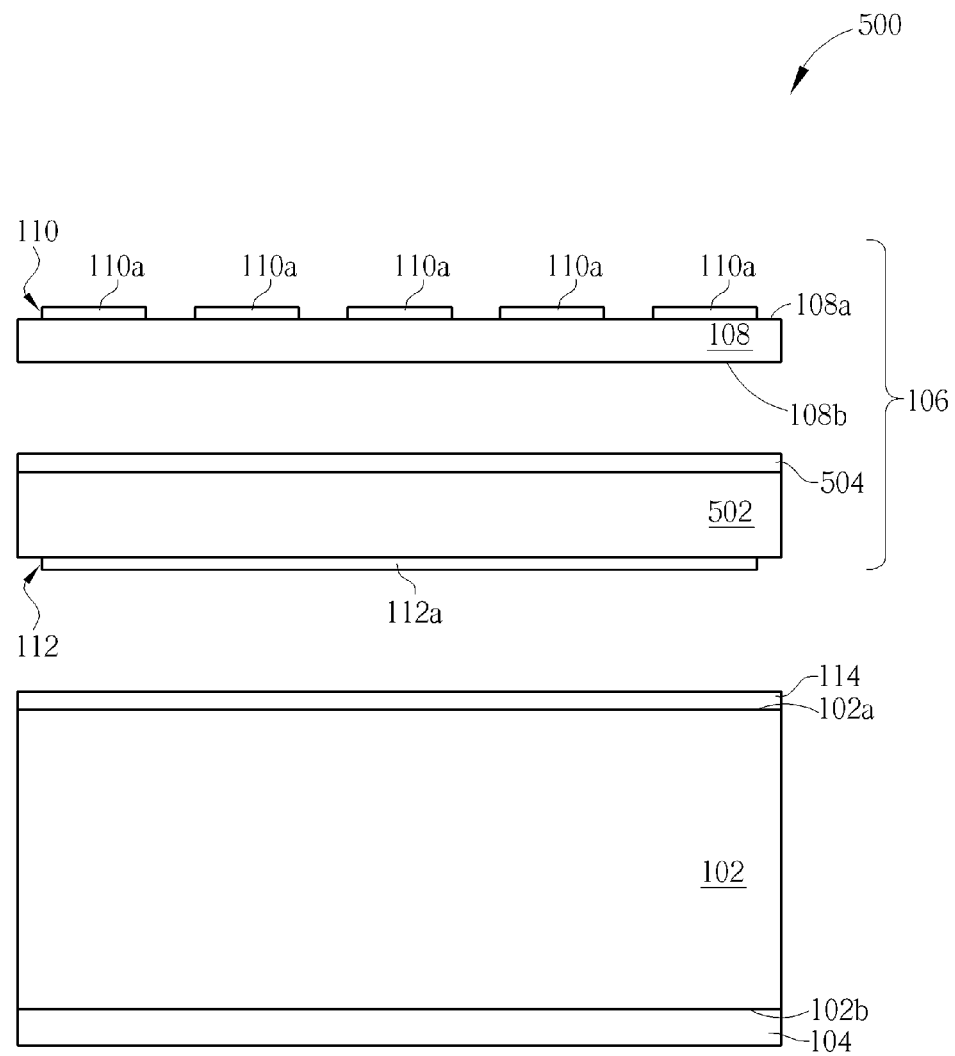
FIG. 6 is a schematic diagram illustrating an exploded cross-sectional view of a touch-sensing liquid crystal display panel according to a fifth embodiment of the present invention.

Please refer to FIG. 6, which is a schematic diagram illustrating an exploded cross-sectional view of a touch-sensing liquid crystal display panel according to a fifth embodiment of the present invention. As shown in FIG. 6, as compared with the first embodiment, the second surface 108b of the second polarization plate 108 of the touch-sensing liquid crystal display panel 500 faces the display surface 102a of the liquid crystal panel 102. Thus, the first surface 108a of the second polarization plate 108 formed with the first patterned sensing electrode layer 110 is disposed upwardly. The touch-sensing panel 106 further includes a transparent substrate 502 and a second adhesive layer 504 disposed between the second surface 108b of the second polarization plate 108 and the liquid crystal panel 102. Furthermore, the transparent substrate 502 and the second adhesive layer 504 are disposed between the second surface 108b of the second polarization plate 108 and the second patterned sensing electrode layer 112, and the second patterned sensing electrode layer 112 is directly formed on the bottom surface of the transparent substrate 502 so as to be directly attached on the transparent substrate 502. The first adhesive layer 114 is disposed between the transparent substrate 502 and the liquid crystal panel 102, and is configured to attach the transparent substrate 502 to the liquid crystal panel 102. The second adhesive layer 504 is disposed between the transparent substrate 502 and the second polarization plate 108, and is configured to attach the transparent substrate 502 to the second polarization plate 108. The arranged directions of the first sensing electrodes and the second sensing electrode of this embodiment are the same as the above embodiments, and will not be mentioned redundantly. In other embodiments of the present invention, each first sensing electrode and each second sensing electrode also can be respectively a series formed by a plurality of square, diamond or hexagonal pads. Also, the arranged direction of the first sensing electrodes and the arranged direction of the second sensing electrodes can be exchanged.

Figure 7:
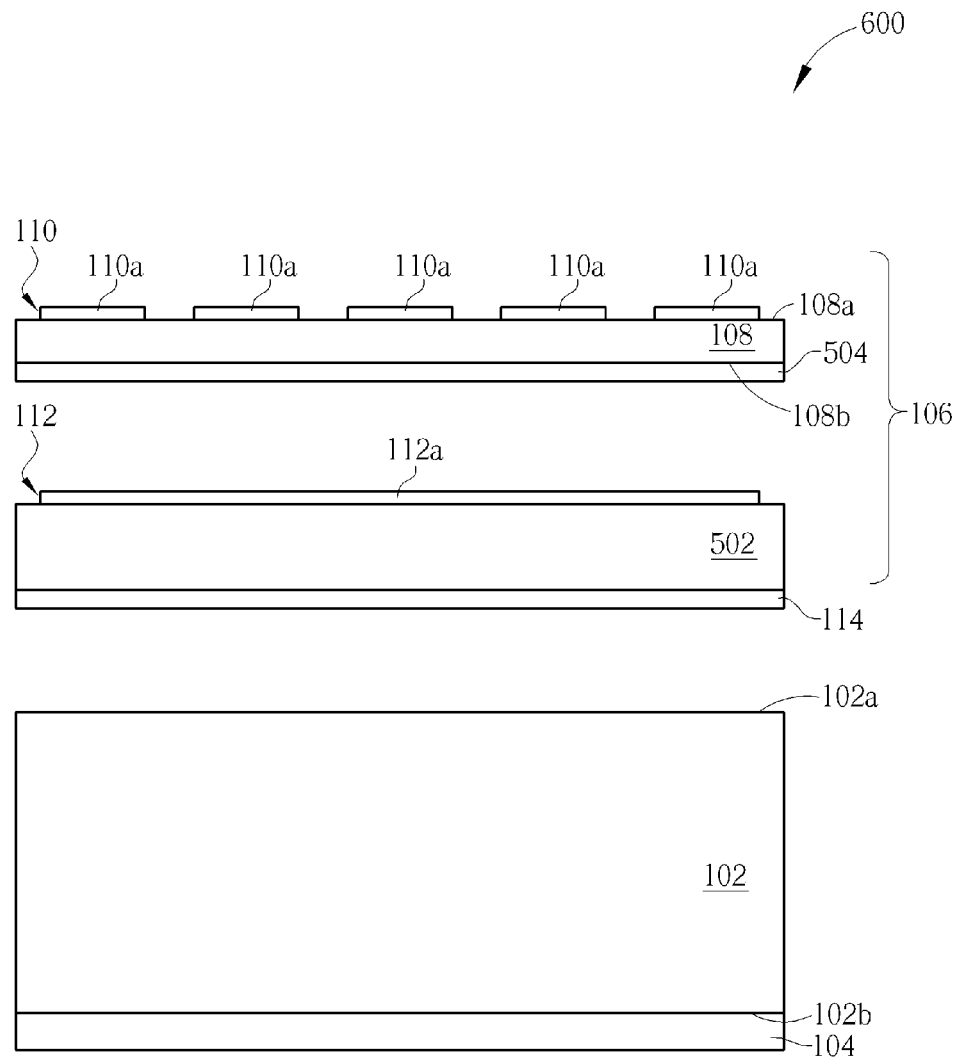
FIG. 7 is a schematic diagram illustrating an exploded cross-sectional view of a touch-sensing liquid crystal display panel according to a sixth embodiment of the present invention.

Please refer to FIG. 7, which is a schematic diagram illustrating an exploded cross-sectional view of a touch-sensing liquid crystal display panel according to a sixth embodiment of the present invention. As shown in FIG. 7, as compared with the fifth embodiment, the second patterned sensing electrode layer 112 of the touch-sensing liquid crystal display panel 600 in this embodiment is directly formed on the top surface of the transparent substrate 502, and thus, is disposed between the transparent substrate 502 and the second polarization plate 108. In addition, the second adhesive layer 504 is disposed between the second patterned sensing electrode layer 112 and the second polarization plate 108, and is configured to attach the surface of the transparent substrate 502 formed with the second patterned sensing electrode layer 112 to the second surface 108b of the second polarization plate 108.

Figure 8:
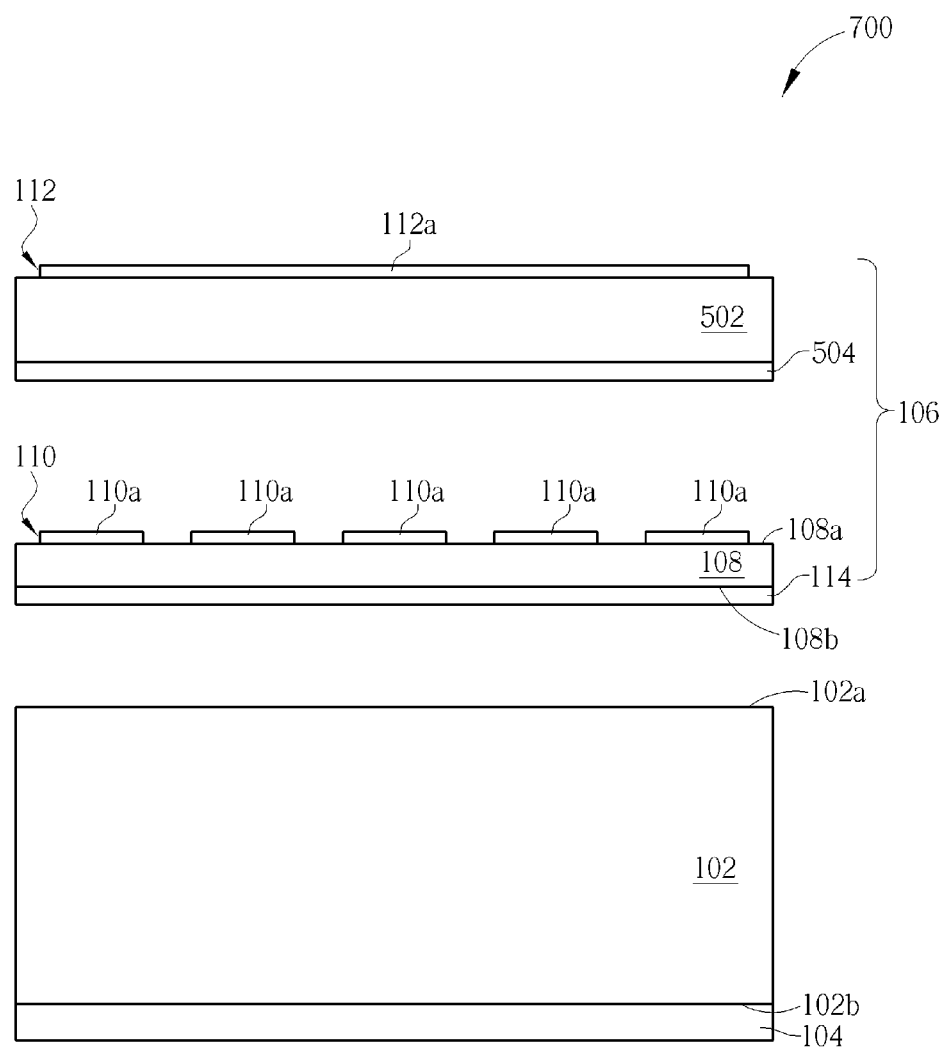
FIG. 8 is a schematic diagram illustrating an exploded cross-sectional view of a touch-sensing liquid crystal display panel according to a seventh embodiment of the present invention.

Please refer to FIG. 8, which is a schematic diagram illustrating an exploded cross-sectional view of a touch-sensing liquid crystal display panel according to a seventh embodiment of the present invention. As shown in FIG. 8, as compared with the fifth embodiment, the second patterned sensing electrode layer 112, the transparent substrate 502 and the second adhesive layer 504 of the touch-sensing liquid crystal display panel 700 in this embodiment are disposed on the first surface 108a of the second polarization plate 108, and the second patterned sensing electrode layer 112 is directly formed on the top surface of the transparent substrate 502. Furthermore, the transparent substrate 502 is disposed between the first patterned sensing electrode layer 110 and the second patterned sensing electrode layer 112, and is configured to insulate the first patterned sensing electrode layer 110 from the second patterned sensing electrode layer 112. The first adhesive layer 114 is disposed between the second polarization plate 108 and the liquid crystal panel 102, and is configured to attach the second polarization plate 108 to the liquid crystal panel 102. The second adhesive layer 504 is disposed between the transparent substrate 502 and the second polarization plate 108, and is configured to attach the transparent substrate 502 to the second polarization plate 108.

Figure 9:
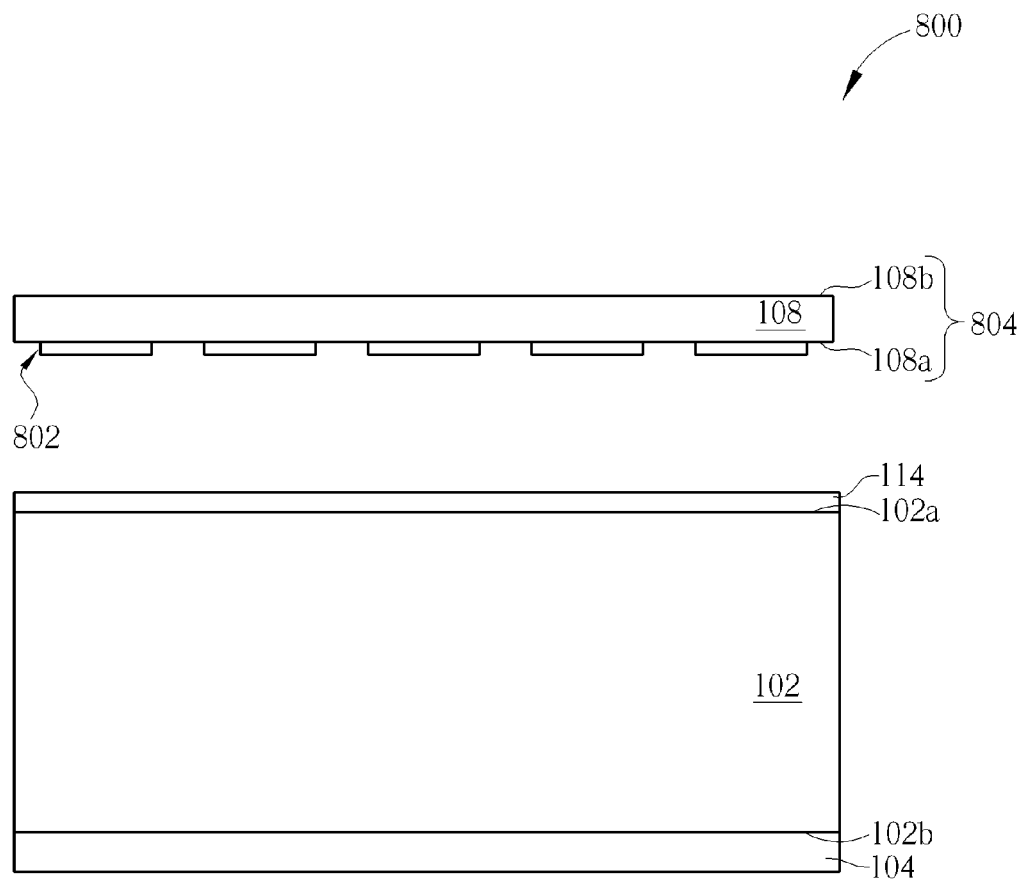
FIG. 9 is a schematic diagram illustrating an exploded cross-sectional view of a touch-sensing liquid crystal display panel according to an eighth embodiment of the present invention.

Please refer to FIG. 9, which is a schematic diagram illustrating an exploded cross-sectional view of a touch-sensing liquid crystal display panel according to an eighth embodiment of the present invention. As shown in FIG. 9, as compared with the first embodiment, the touch-sensing liquid crystal display panel 800 in this embodiment only includes one patterned sensing electrode layer 802, that is to say, the touch-sensing panel 804 is only formed by the patterned transparent conductive layer 802 and the second polarization plate 108, and the patterned transparent conductive layer 802 is directly attached on the first surface 108a of the second polarization plate 108. In this embodiment, the first surface 108a faces the display surface 102a of the liquid crystal panel 102. Furthermore, the patterned transparent conductive layer 802 can be used to sense a position of an object touching the touch-sensing panel 804 in the first direction X and in the second direction Y together. Furthermore, since the touch-sensing panel 804 only uses single layer patterned sensing electrode layer 802, the thickness of the touch-sensing panel 804 can be further reduced as compared with the first embodiment. Also, the thickness of the touch-sensing liquid crystal display panel 800 can be reduced accordingly.

Figure 10:
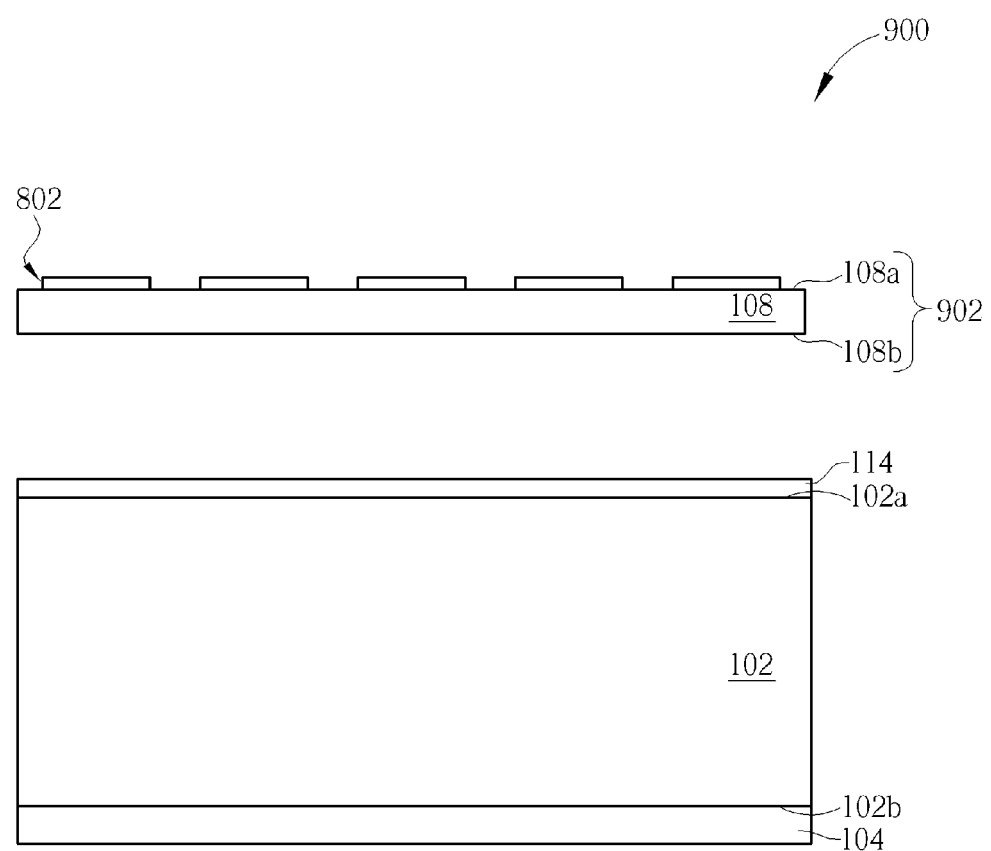
FIG. 10 is a schematic diagram illustrating an exploded cross-sectional view of a touch-sensing liquid crystal display panel according to a ninth embodiment of the present invention.

Please refer to FIG. 10, which is a schematic diagram illustrating an exploded cross-sectional view of a touch-sensing liquid crystal display panel according to a ninth embodiment of the present invention. As shown in FIG. 10, as compared with the eighth embodiment, the second surface 108b of the second polarization plate 108 in the touch-sensing liquid crystal display panel 900 of this embodiment faces display surface 102a of the liquid crystal panel 102. That is to say, the first surface 108a of the second polarization plate 108 faces outwardly, and the patterned transparent conductive layer 802 is directly attached on the first surface 108a of the second polarization plate 108. Also, the thickness of the touch-sensing panel 902 of this embodiment can be further reduced as compared with the first embodiment, and the thickness of the touch-sensing liquid crystal display panel 900 can be reduced accordingly.

In summary, at least one of the patterned sensing electrode layers is directly formed on a surface of the second polarization plate, and is directly attached on the surface of the second polarization plate in the present invention. Thus, the cost of the transparent substrate that is used to dispose the patterned sensing electrode layer in the prior art can be saved in the touch-sensing liquid crystal display panel of the present invention, and the thickness of the touch-sensing liquid crystal display panel can accordingly be reduced. For this reason, the weight of the touch-sensing liquid crystal display panel can be reduced, and thereby, the cost of the touch-sensing liquid crystal display panel can be decreased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch-sensing liquid crystal display panel, comprising:
   a liquid crystal panel, having a display surface and a back surface, the display surface and the back surface being disposed opposite to each other;
   a first polarization plate, disposed on the back surface of the liquid crystal panel; and
   a touch-sensing panel, disposed on the display surface of the liquid crystal panel, and the touch-sensing panel comprising:
      a second polarization plate, having a first surface and a second surface, and the first surface and the second surface being disposed opposite to each other, wherein the first surface faces the liquid crystal panel;
      a first patterned sensing electrode layer, disposed on the first surface of the second polarization plate, and the first patterned sensing electrode layer being directly attached on the first surface of the second polarization plate;
      a transparent substrate, disposed between the second polarization plate and the liquid crystal panel;
      a second patterned sensing electrode layer, directly attached on the transparent substrate;

a first adhesive layer, disposed between the transparent substrate and the liquid crystal panel, wherein the first adhesive layer doesn't overlap the first patterned sensing electrode layer and the second patterned sensing electrode layer, and the first adhesive layer is disposed at a peripheral region of the touch-sensing panel; and a second adhesive layer, disposed between the transparent substrate and the second polarization plate.

2. The touch-sensing liquid crystal display panel according to claim 1, wherein the second patterned sensing electrode layer is directly attached on a surface of the transparent substrate facing the liquid crystal panel.

3. The touch-sensing liquid crystal display panel according to claim 1, wherein the second adhesive layer covers a surface of the transparent substrate facing the second polarization plate.

4. The touch-sensing liquid crystal display panel according to claim 1, wherein the first patterned sensing electrode layer comprises a plurality of first sensing electrodes arranged in parallel and sequentially along a first direction, and the second patterned sensing electrode layer comprises a plurality of second sensing electrodes arranged in parallel and sequentially along a second direction different from the first direction.

5. The touch-sensing liquid crystal display panel according to claim 1, wherein the first patterned sensing electrode layer and the second patterned sensing electrode layer comprise antimony tin oxide or antimony zinc oxide.

* * * * *